(12) United States Patent
Maeoka et al.

(10) Patent No.: US 9,703,692 B2
(45) Date of Patent: Jul. 11, 2017

(54) DEVELOPMENT SUPPORTING SYSTEM

(71) Applicant: HITACHI, LTD., Tokyo (JP)

(72) Inventors: Jun Maeoka, Tokyo (JP); Hideki Nakamura, Tokyo (JP); Akira Tanaka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/782,881

(22) PCT Filed: Jul. 30, 2014

(86) PCT No.: PCT/JP2014/070123
§ 371 (c)(1),
(2) Date: Oct. 7, 2015

(87) PCT Pub. No.: WO2016/016975
PCT Pub. Date: Feb. 4, 2016

(65) Prior Publication Data
US 2016/0378647 A1    Dec. 29, 2016

(51) Int. Cl.
*G06F 9/44* (2006.01)
*G06F 9/45* (2006.01)
(Continued)

(52) U.S. Cl.
CPC .......... *G06F 11/3688* (2013.01); *G06F 11/28* (2013.01); *G06F 11/36* (2013.01); *G06F 11/3668* (2013.01); *G06F 11/3644* (2013.01)

(58) Field of Classification Search
CPC ...... G06F 11/3688; G06F 11/28; G06F 11/36; G06F 11/3664–11/3692
See application file for complete search history.

(56) References Cited

U.S. PATENT DOCUMENTS 8,276,123 B1 * 9/2012 Deng .................... G06F 11/368
714/37
8,561,036 B1 * 10/2013 Beans ................... G06F 11/368
717/124
(Continued)

FOREIGN PATENT DOCUMENTS

JP  2008-204405 A  9/2008
JP  2010-134643 A  6/2010

OTHER PUBLICATIONS

Mehdi Mirzaaghaei, Supporting Test Suite Evolution through Test Case Adaptation, 2012, pp. 1-10.*
(Continued)

*Primary Examiner* — Thuy Dao
*Assistant Examiner* — Mongbao Nguyen
(74) *Attorney, Agent, or Firm* — Mattingly & Malur, PC (57) ABSTRACT

Provided is a development supporting system that extracts important test cases in accordance with development statuses of a program, test statuses, etc. The development supporting system according to a representative embodiment includes a configuration managing unit that retains and manages the program and each of the test cases in a repository, and a test executing unit that executes the test case and stores a test result in the repository. The test case is managed in the repository in association with information of a type thereof, the configuration managing unit judges a development status of the program and sets a priority for each of the test cases based on the development status, and the test executing unit extracts the test case to be executed based on the priority.

6 Claims, 10 Drawing Sheets

(51) Int. Cl.
*G06F 11/36* (2006.01)
*G06F 11/28* (2006.01)

(56) References Cited

U.S. PATENT DOCUMENTS

| | | | | |
|---|---|---|---|---|
| 2007/0220479 A1* | 9/2007 | Hughes | | G06Q 30/02 717/100 |
| 2007/0300208 A1* | 12/2007 | Furukawa | | G06F 11/3672 717/127 |
| 2008/0184206 A1* | 7/2008 | Vikutan | | G06F 11/3688 717/127 |
| 2009/0199045 A1* | 8/2009 | Kasubuchi | | G06F 11/3684 714/38.1 |
| 2009/0265694 A1* | 10/2009 | Bakowski | | G06F 11/3676 717/131 |
| 2010/0131497 A1* | 5/2010 | Peterson | | G06Q 10/06 707/722 |
| 2011/0246540 A1* | 10/2011 | Salman | | G06F 11/3672 707/812 |
| 2012/0089964 A1* | 4/2012 | Sawano | | G06F 11/3684 717/124 |
| 2012/0304157 A1* | 11/2012 | Kawashima | | G06F 11/3672 717/131 |
| 2014/0181590 A1* | 6/2014 | Wefers | | G06F 11/3688 714/38.1 |
| 2014/0351793 A1* | 11/2014 | Bartley | | G06F 11/3676 717/124 |

OTHER PUBLICATIONS

Siripong Roongruangsuwan, A Test Case Prioritization Method with Practical Weight Factors, 2010, pp. 1-15.*
Sandra Kukolj, Selection and Prioritization of Test Cases by Combining White-Box and Black-Box Testing Methods, 2013, pp. 1-4.*
International Search Report of PCT/JP2014/070123.

* cited by examiner

132: TEST-CASE MANAGEMENT TABLE

| No. | TEST CLASS | FUNCTION TYPE | TEST TYPE | CREATOR | PRIORITY |
|---|---|---|---|---|---|
| 1 | RegTest.class | UI SYSTEM | REGRESSION | tanaka | 1 |
| 2 | NormalTest.class | UI SYSTEM | NORMAL SYSTEM | sato | −1 |
| 3 | DbTest.class | DB SYSTEM | ABNORMAL SYSTEM | sato | −1 |
| 4 | LogicTest.class | LOGIC SYSTEM | REGRESSION | sato | 1 |
| ... | ... | ... | ... | ... | ... |

FIG. 10

131: BRANCH MANAGEMENT TABLE

| BRANCH NAME | FILE LIST |
|---|---|
| master | A.java, B.java, ... |
| release | A.java, B.java, ... |
| develop | A.java, B.java, ... |
| feature_A | A.java, B.java, ... |
| feature_B | A.java, B.java, ... |
| feature_A_tanaka | A.java, B.java, ... |
| feature_A_sato | A.java, B.java, ... |
| ... | ... |

FIG. 11

131a: COMMIT HISTORY

| BRANCH NAME | COMMIT TIME AND DATE | MODIFICATION CONTENTS |
|---|---|---|
| feature_A_sato | 2014/05/26 10:56:34 | A.java |
| feature_A_sato | 2014/05/27 11:39:15 | B.java |
| feature_A_sato | 2014/05/28 16:04:47 | B.java |
| ... | ... | ... |

FIG. 12

137: FUNCTION MASTER

| FUNCTION NAME | FUNCTION TYPE |
|---|---|
| A | LOGIC SYSTEM |
| B | UI SYSTEM |
| C | DB SYSTEM |
| D | UI SYSTEM |
| ... | ... |

FIG. 13

138:DEVELOPER MASTER

| USER NAME | SERVICE IN CHARGE |
|---|---|
| tanaka | A |
| sato | B |
| yamada | B |
| ... | ... |

FIG. 14

136:REVIEW MANAGEMENT TABLE

| MERGE REQUEST | MERGE TARGET | MERGE DESTINATION | THE NUMBER OF REVIEWS | REVIEW SCORE |
|---|---|---|---|---|
| #1 | feature_A_sato | feature_A | 100 | +10 |
| #2 | feature_A | master | 10 | +50 |
| #3 | feature_A | master | 10 | -10 |
| ... | ... | ... | ... | ... |

DEVELOPMENT SUPPORTING SYSTEM

TECHNICAL FIELD

The present invention relates to techniques of software development, and particularly relates to the techniques effective when applied to a development supporting system that extracts test cases in the tests for, for example, checking failure of a program.

BACKGROUND ART

A software program (hereinafter, simply described as "program" in some cases) contains defects caused by human-induced errors. It is general to carry out a test in order to search and correct the defects contained in the program before shipment of a program product. In carrying out the test, for example, the location(s) and cause(s) of the defect(s) in the program serving as a test target are found out by sequentially executing test cases serving as programs for the tests, which set and execute various conditions for the program serving as the test target, and generating failure.

Furthermore, for example, tools and techniques related to so-called continuous integration (CI: Continuous Integration), which automatically execute the test cases, have become wide spread. In the tools, etc. for realizing CI, generally, a program which is developed by a plurality of persons is managed in a centralized manner in a storage region called a repository on a central storage server. Then, every time a developer registers the developed program in the repository, test cases are automatically executed to check whether defects are present in the registered program or not, thereby ensuring quality of the program.

Meanwhile, there is provided a mechanism in which a plurality of developers, etc. approves development contents by reviews for checking contents of related objects such as source code of the program managed in the repository. Such methods of cooperative development by a plurality of developers and software development by reviews are called social coding.

On the other hand, in carrying out tests, there is a problem that execution time is increased along with the volume of the test cases. Since defects of a program normally occur only under particular conditions, many test cases expecting all conditions have to be prepared and executed in order to search that. Therefore, execution of the test cases requires long time.

For this problem, for example, Japanese Patent Application Laid-Open No. 2008-204405 (Patent Document 1) describes techniques of saving the information of test cases of the tests carried out in the past, combining the information and the dependence relations obtained by analyzing a target program, thereby automatically extracting the parts which are supposed to be tested on a priority basis in accordance with changed parts of the program to carry out a regression test.

Moreover, Japanese Patent Application Laid-Open No. 2010-134643 (Patent Document 2) describes techniques of retaining importance and execution record time in a repository as attributes of test cases and, when there is a notification of a source change from a source configuration managing tool, which has received source registration from a developer, to a CI tool, analyzing a changed file passed from the CI tool, storing an analysis result in the repository, and selecting the test cases to be executed according to execution importance and an execution time threshold value passed from the CI tool, and the importance and execution record time of the test cases stored in the repository.

RELATED ART DOCUMENTS

Patent Documents

Patent Document 1: Japanese Patent Application Laid-Open No. 2008-204405
Patent Document 2: Japanese Patent Application Laid-Open No. 2010-134643

SUMMARY OF THE INVENTION

Problems to be Solved by the Invention

All of the tests methods according to the above-described conventional techniques are to solve the above-described problem that it takes time to carry out the test cases by executing limited important test cases among the test cases.

However, in the test methods according to the conventional techniques, for example, the test cases cannot be extracted in consideration of development statuses, development phases, etc. of a program such as a development initial stage, an intermediate stage, and a latter stage. Moreover, the test cases cannot be extracted in consideration of the test contents, statuses to carry out the test, etc. such as manipulators who carry out the tests, viewpoints to carry out the tests, etc.

Therefore, it is an object of the present invention to provide a development supporting system that extracts important test cases in accordance with a development status of a program, a test status, etc.

The above described and other objects and novel features of the invention will be clear from the description of the specification and the accompanying drawings.

Means for Solving the Problems

Of the inventions disclosed in this application, the summaries of the representatives will be explained as below.

A development supporting system according to a representative embodiment of the present invention is the development supporting system that tests a program by executing one or more test cases, and the development supporting system includes a configuration managing unit that retains and manages the program and each of the test cases in a repository, and a test executing unit that executes the test case and stores a test result in the repository. Then, the test case is managed in the repository in association with information of a type thereof, the configuration managing unit judges a development status of the program and sets a priority for each of the test cases based on the development status, and the test executing unit extracts the test case to be executed based on the priority.

Effects of the Invention

Among the inventions disclosed in the application, the advantageous effects obtained by the representatives will be briefly explained as below.

That is, according to a typical embodiment of the present invention, it is possible to extract important test cases in accordance with development statuses of a program, test statuses, etc.

DETAILED DESCRIPTION OF PREFERRED EMBODIMENTS

As below, embodiments of the invention will be explained in detail with reference to the drawings. Note that, in all drawings for explanation of the embodiments, the same members basically have the same signs and their repetitive explanation will be omitted.

As described above, in an environment of social coding in which a plurality of developers develop a program(s) via a network, tools, etc. for realizing CI such as automatic execution of tests have been generally spread. However, although it is automatic execution, executing all of a massive number of test cases takes extremely long time, and it is not efficient. Therefore, there are demands to limit the test cases to only important parts and execute them, or to execute the important parts on a priority basis.

Herein, in the conventional techniques of the above-described Patent Documents, etc., efficiency to carry out test cases can be improved by limiting the test cases to the important ones and executing them. However, it has not been realized to take the development status of the program, test status, etc. into consideration. For example, as consideration of the development status, even for a single program, the contents desired to be tested may be different depending on the progress degree of development processes (for example, between a development initial stage and a development latter stage) or the maturity degree of the program per se along with time elapse. Moreover, the contents desired to be tested may be different between a case in which the frequency of registering (committing) modifications added to the program is high and a case in which the volume of the modifications (differences) is small, and between a case in which the registration frequency is low and a case in which the modification differences are large. The conventional techniques lack the viewpoint to determine importance in consideration of the development status including such temporal viewpoints.

Moreover, as a consideration of the test status, even for a single program, the viewpoint desired to be tested may be different between, for example, a local single test by a developer and an overall examination test by program integration. The conventional techniques lack the viewpoint to determine importance in consideration of such test contents to be carried out.

Therefore, a development supporting system according to an embodiment of the present invention makes it possible to extract important test cases, or carry out such important test cases on a priority basis based on the viewpoints of the development status of the program or for carrying out the test in a social coding environment. As a result, the tests can be efficiently carried out without exhaustively carrying out all of a massive number of test cases.

Figure 2:
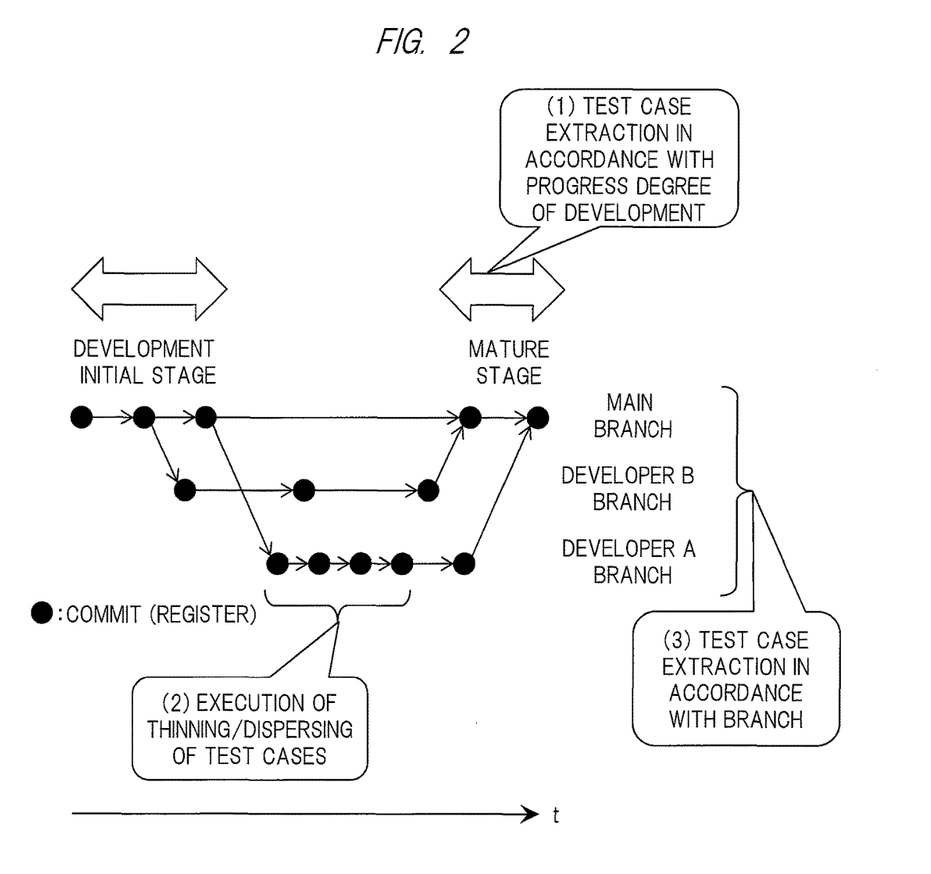
FIG. 2 is a drawing explaining an outline of a problem to be solved by the development supporting system according to the embodiment of the present invention.

FIG. 2 is a drawing explaining an outline of a problem to be solved by the development supporting system according to the above-described embodiment of the present invention. In the drawing, in social coding, version management, or repository management, branching examples of branches which are regions to manage a program (s) in each of development units are shown, and an example of the status of registration (commit) of a program developed by the branches is shown in a temporal sequence from the left to the right direction. Herein, it shows a state in which each of developers A and B has created the branches for their own development by branching them from a main branch, and they are integrated (merged) with the main branch after development is completed.

Figure 3:
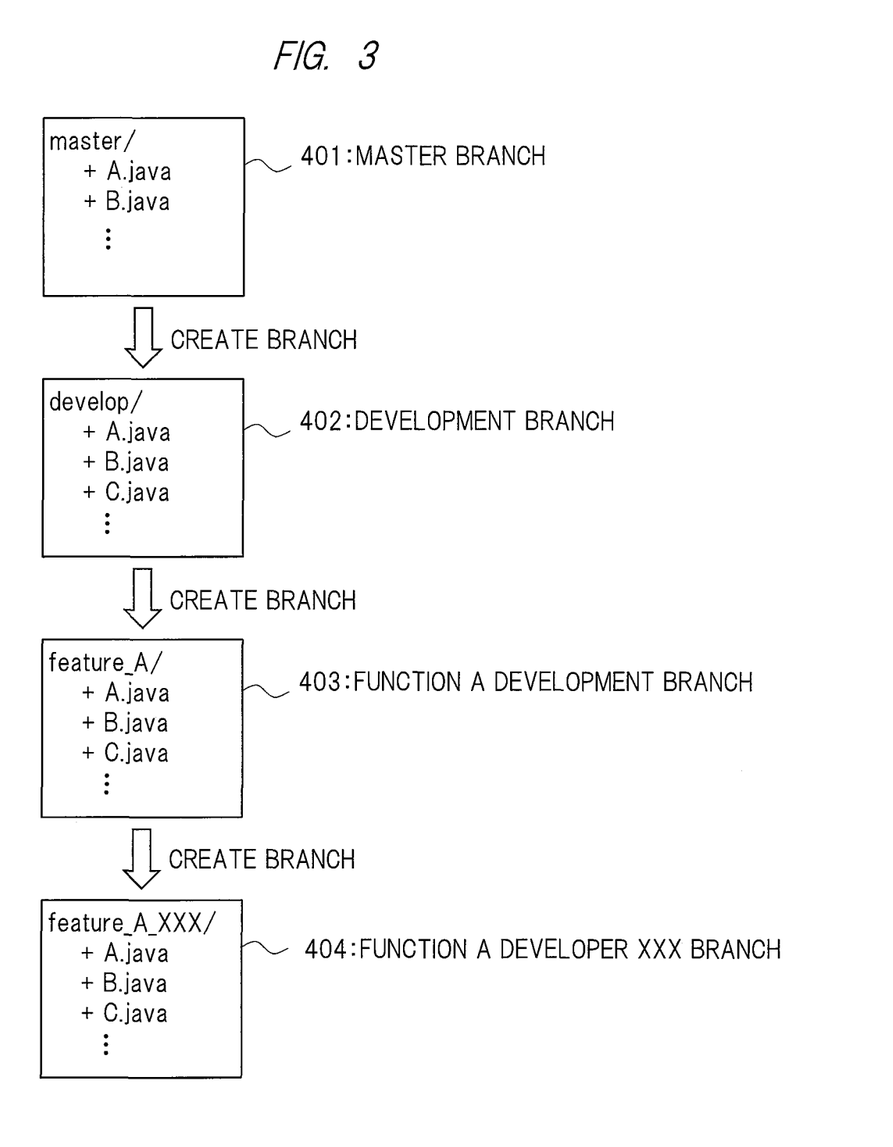
FIG. 3 is a drawing showing an outline of a creation example of branches in social coding.

As described above, the program is managed on the branches which are individually provided in the units of development uses, developers, etc. FIG. 3 is a drawing showing an outline of a creation example of branches in social coding. The drawing shows that programs (source code) such as "A. java" and "B. java" are registered in a master branch 401 (branch name "master") in which a program serving as a master is registered. New branches can be created at optional timing and can be created by, for example, copying an existing repository. In this case, the created branches are branched from the original branch. Note that a first branch is newly created.

The example of FIG. 3 shows a state in which a development branch 402 (branch name "develop"), which is a main branch for development, is created by branching from the master branch 401. Furthermore, it shows a state in which a function A development branch 403 (branch name "feature_A"), which is a branch for developing a function A, is created by branching from the development branch 402, and a function A developer XXX branch 404 (branch name "feature_A_XXX"), which is a branch for a developer having a name "XXX", is created by branching from the function A development branch 403.

Figure 4:
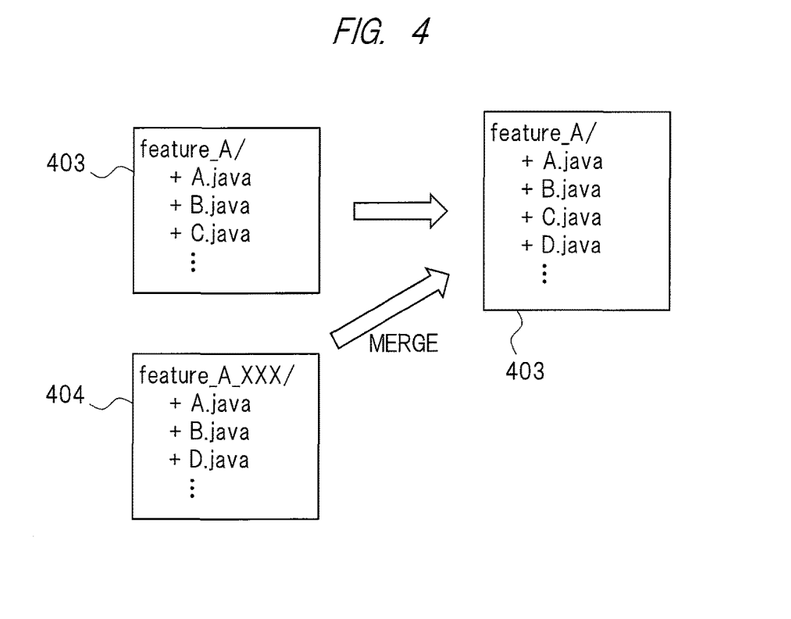
FIG. 4 is a drawing showing an outline of an integration example of branches in social coding.

Moreover, the created branches can be integrated (merged) with the branching source at optional timing such as completion of the development target program. FIG. 4 is a drawing showing an outline of an integration example of branches in social coding. The drawing shows a state in which the function A developer XXX branch 404, which has been created by branching, is merged with the function A development branch 403, which is a branching source. As a result of merging, the contents of the program registered in the function A developer XXX branch 404 are merged with the function A development branch 403 by overwriting. As shown in FIG. 2 to FIG. 4, along with progress of development, development is advanced while the program is branched into a plurality of branches or a plurality of branches are integrated.

Tests are carried out in each stage of development, among the above-described consideration points upon extraction of important test cases, the extraction method in which the development status of the program including the temporal viewpoint is taken into consideration includes, for example, extracting appropriate types of test cases in accordance with the progress degree of development (development initial stage, mature stage, etc.) as shown in (1) of FIG. 2. Moreover, as shown in (2) of FIG. 2, it includes, for example, thinning and extracting test cases and dispersing and executing a plurality of tests if the frequency of commits is high (interval is short) or if the volume of modification differences is large.

On the other hand, among the consideration points upon extraction of important test cases, the extraction method in which the viewpoint for carrying out the test is taken into consideration includes, for example, as shown in (3) of FIG. 2, changing test targets in accordance with target branches and extracting appropriate test cases (for example, a local single test in a case of a developer branch, or an overall examination test after the program is integrated in a case of the main branch).

<System Configuration>

Figure 1:
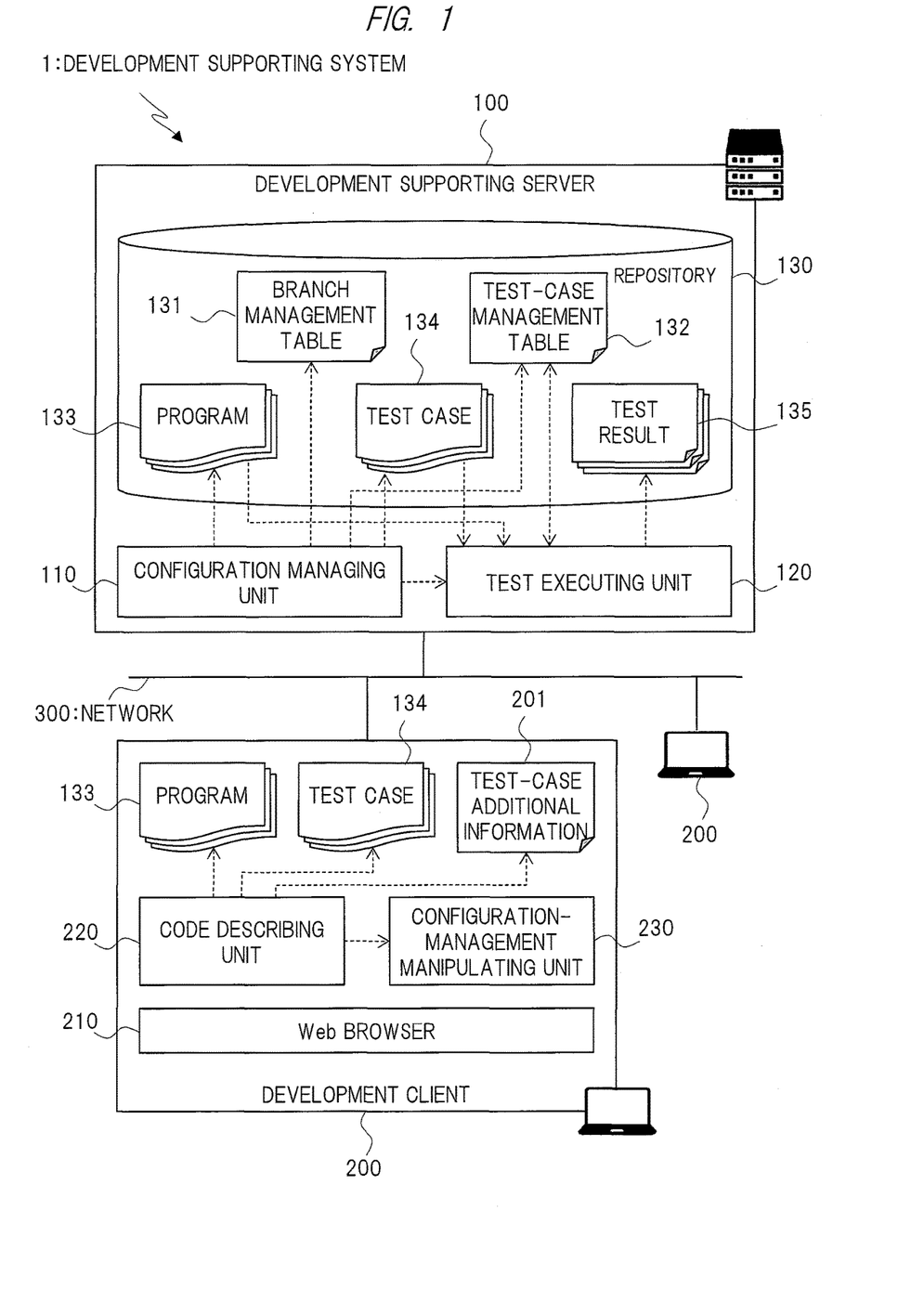
FIG. 1 is a drawing showing an outline of a configuration example of a development supporting system according to an embodiment of the present invention.

FIG. 1 is a drawing showing an outline of a configuration example of a development supporting system according to an embodiment of the present invention. A development supporting system 1 has, for example, a configuration for allowing mutual communication in which a plurality of development clients 200, which are used by users, respectively, are connected to a development supporting server 100 via a network such as a LAN (Local Area Network).

The development supporting server 100 is, for example, a server system having functions such as extraction of test cases and automatic execution of tests, is implemented by a virtual server or the like build in general server equipment or a cloud computing environment, and has units such as a configuration managing unit 110 and a test executing unit 120, which are implemented by a software program(s) working on middleware such as an OS (Operating System: not shown), a DBMS (Database Management System: not shown), and a Web server program (not shown).

Moreover, the development supporting server 100 has a repository 130, which is a storage region of a database or the like which stores programs and various products developed by a plurality of developers and manages them in a centralized manner. The repository 130 retains, for example, other than tables such as a branch management table 131 and a test-case management table 132 described later, various data such as developed programs 133, extracted/created test cases 134, and test results 135 which are test results to be carried out.

The configuration managing unit 110 has a function to manage the overall configuration of program development and is formed by a server program of a system or a tool which provides a social coding function, a repository managing function, a version managing function, etc. As the tool thereof, for example, a generally spread one such as Git can be applied. The configuration managing unit 110 registers the developed programs 133 in the repository 130 based on, for example, requests, etc. from the development clients 200, which will be described later. In this process, information with which changes and differences from the previous registration can be understood is stored in combination as history information. Moreover, the configuration managing unit 110 has a function to register the test cases 134, which have been created for the programs 133, in the repository 130 and update the test-case management table 132. Moreover, the configuration managing unit 110 also has a function to manage the information of created branches by the branch management table 131.

The test executing unit 120 has a function to automatically execute tests based on the test cases 134, which are registered in the repository 130, in accordance with instructions from the configuration managing unit 110, and, for example, a generally spread test framework or the like such as JUnit can be applied. In the present embodiment, tests can be efficiently carried out by extracting the test cases having high priorities among the test cases 134 and carrying out the tests while they are narrowed down to the extracted test cases 134 by a later-described method. The test cases 134 to be executed are managed by the test-case management table 132, and the test results 135, which are obtained as results of execution of the tests, are also stored and managed in the repository 130.

The development client 200 is an information processing terminal such as a PC (Personal Computer) with which users such as developers carryout operations such as development of the programs 133 and creation of the test cases 134, and the development client 200 has units such as a Web browser 210, a code describing unit 220, and a configuration-management manipulating unit 230, which are implemented by a software program(s) working on middleware such as an OS (not shown).

The code describing unit 220 has a function for the developer(s) to develop/create the programs 133 and create the test cases 134 and can optionally utilize, for example, a program developing tool, a development environment, etc. which are generally spread such as Eclipse. The programs 133 and the test cases 134, which have been developed/created by the developer(s) by utilizing the code describing unit 220, and test-case additional information 201, which is information about the test cases 134, are registered in the repository 130 on the development supporting server 100 by the configuration-management manipulating unit 230, which will be described later.

The configuration-management manipulating unit 230 has a function to communicate with the configuration managing unit 110 of the development supporting server 100, transmit the programs 133, the test cases 134, the test-case additional information 201, etc., which have been developed/created by the code describing unit 220, and register them in the repository 130. For example, if Git is used as the configuration managing unit 110 of the development supporting server 100, it can be implemented by a Git client or the like.

The Web browser 210 is a Web browser program, which provides a user interface for the developer(s) to carry out operations such as program development, reviewing, etc. using the code describing unit 220 and the configuration-management manipulating unit 230 in social coding, and can optionally use a generally spread one. The Web browser 210 may have a function to carry out communication with the configuration managing unit 110 of the development supporting server 100, etc. via a Web server program (not shown) on the development supporting server 100.

<Process Flow (Test Case Creation)>

Figure 5:
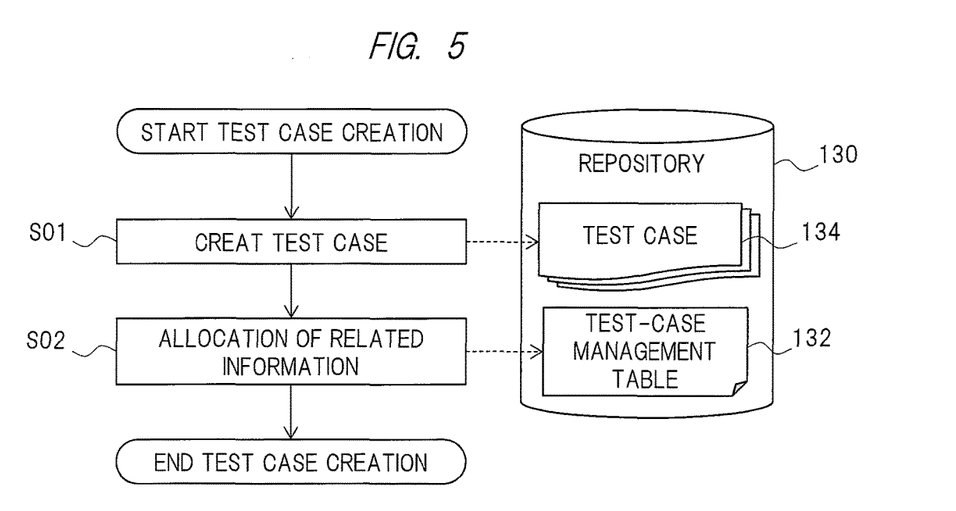
FIG. 5 is a flow chart showing an outline of a flow example of a process of test-case creation according to the embodiment of the present invention.

Hereinafter, processes for carrying out the test in the present embodiment will be explained. FIG. 5 is a flow chart showing an outline of a flow example of a process of test-case creation. First, a creator of a test case creates the test case 134 by the code describing unit 220 by utilizing the development client 200, and registers the test case 134 in the repository 130 via the configuration managing unit 110 of the development supporting server 100 (S01). In this process, the configuration managing unit 110 allocates related information including the type, etc. of the test case 134 thereto and registers that in the later-described test-case management table 132 in combination (S02).

<Process Flow (Test Execution)>

Figure 6:
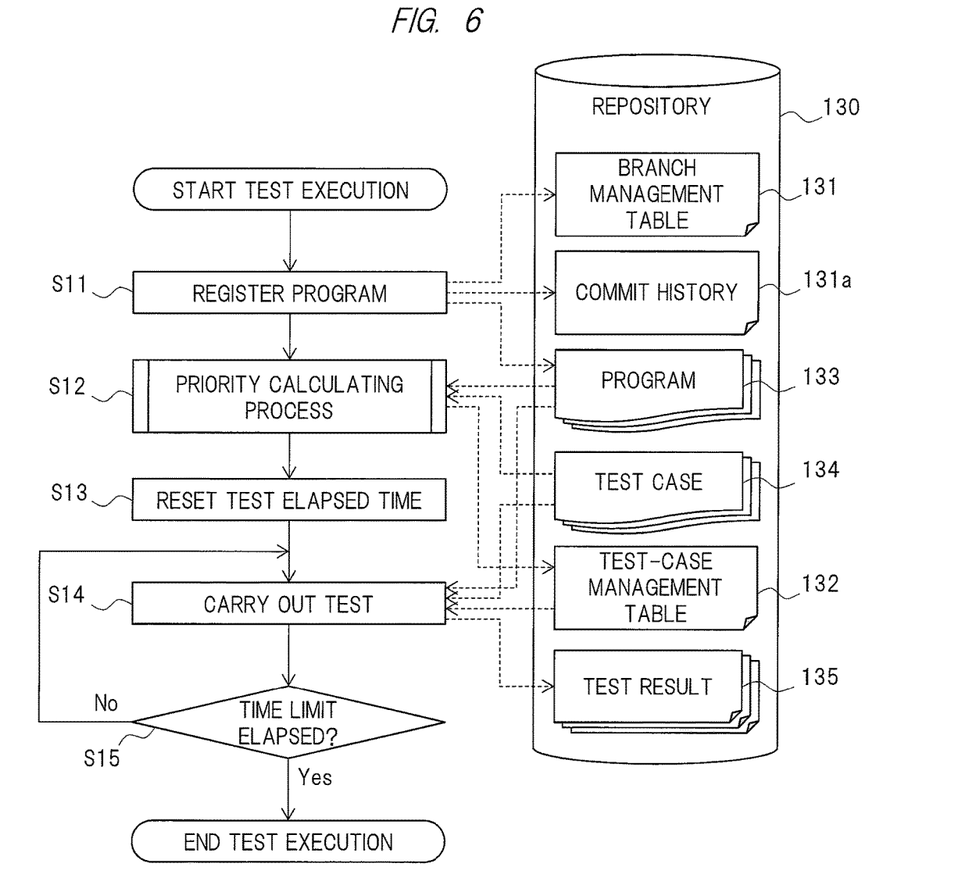
FIG. 6 is a flow chart showing an outline of a flow example of a process of test execution according to the embodiment of the present invention.

FIG. 6 is a flow chart showing an outline of a flow example of a process of test execution based on the created test cases 134. First, the developer of the program 133 utilizes the development client 200 to register (commit) the developed program 133 into the repository 130 of the development supporting server 100 by the code describing unit 220 and the configuration-management manipulating unit 230 (S11). The registration herein may be, for example, in a form in which only the differences related to changes and modifications are registered. The information of the registered program 133 is managed for each branch by the later-described branch management table 131. Moreover, the registered history of the program 133 is managed by a later-described commit history 131a.

When the program 133 is registered in the repository 130, the configuration managing unit 110 or the test executing unit 120 of the development supporting server 100 calculates, regarding the registered program 133, the priorities of the test cases 134, which are registered in the test-case management table 132, respectively by a predetermined method, and updates the test-case management table 132 by the values of the calculated priorities (S12). The contents of the priority calculating process will be described later.

Then, the test executing unit 120 of the development supporting server 100 resets test elapsed time as an initial process (S13) and then carries out tests (S14). When the tests are carried out, in the descending order of the priorities registered in the test-case management table 132 or regarding the tests having the priorities higher than a predetermined value, the test cases 134 and the programs 133 are read from the repository 130 and executed, and the test results 135 are stored into the repository 130. Then, whether a predetermined time limit has elapsed or not from start of the tests is judged (S15). If the predetermined time limit has not elapsed, the process returns to step S14, and the process to carry out the tests is continued. On the other hand, if the predetermined time limit has elapsed, test execution is ended.

By the above process, the tests can be carried out while they are narrowed down to the highly prioritized test cases 134, and as a result, efficiency of the tests can be improved. Note that, regarding the test cases 134 which have not been executed because of elapse of the predetermined time limit in step S15, for example, a list thereof is retained, and the test cases 134 may be carried out by night-time regular processes or the like. Moreover, if execution of any of the test cases 134 fails in the execution of step S14 within the predetermined time limit, for example, it is desired to carry out tests about the commits corresponding to the test cases 134 whose execution has been skipped because of their low priorities after end of the test execution process, and to examine the time point at which the target test case 134 failed.

<Process Flow (Priority Calculating Process)>

Figure 7:
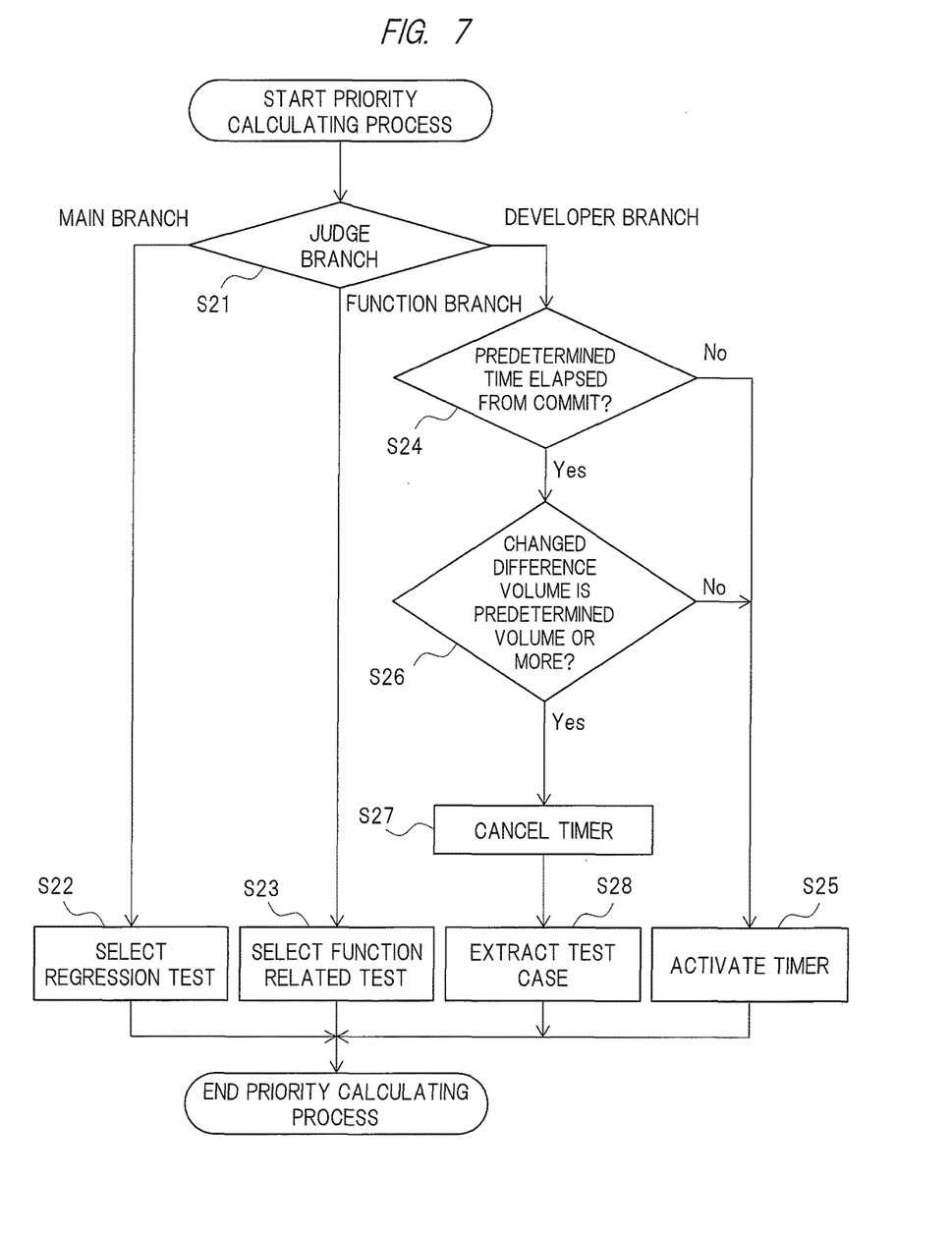
FIG. 7 is a flow chart showing an outline of a flow example of a priority calculating process according to the embodiment of the present invention.

FIG. 7 is a flow chart showing an outline of a flow example of the priority calculating process (S12) in a process flow of the test execution shown in FIG. 6. First, the configuration managing unit 110 or the test executing unit 120 of the development supporting server 100 judges the operation contents of a branch on the repository 130 at which the program 133 serving as the target of the test is registered (S21). For example, as shown in FIG. 3, the operation contents of the branch can be determined based on naming rules of branches.

If the branch is judged to be a main branch in step S21, on the assumption that a regression test is to be executed for the entirety, among the test cases 134, the test cases having "regression test" as a test type are selected and extracted (S22). Upon extraction, the priority thereof may be increased to a maximum value or the like such that the target test case 134 serves as an execution target with no fail. Thus, increasing the priority of the target test case 134 to the maximum value or the like is equivalent to directly extracting the target test case 134. The type of the test case 134, for example, may be determined by the contents registered in the later-described test-case management table 132 or may be determined based on the information of a folder in which the test case 134 is stored, annotation information added to the test case 134, etc.

If the branch is determined to be a function branch in step S21, on the assumption that a test related to a target function is to be executed, among the test cases 134, the test cases having the function type corresponding to the target function are selected and extracted (S23). Also in this case, the priority of the target test case 134 may be increased to the maximum value or the like. The function type of the test case 134, for example, may be determined by the contents registered in the later-described test-case management table 132 and the function master 137, or may be determined based on the information of a folder in which the program 133, the test case 134, etc. related to the target function are stored, annotation information, etc.

If the branch is judged to be a developer branch in step S21, normal-system tests are carried out. First, regarding the target program 133, whether the elapsed time from the previous commit has elapsed predetermined time or more (whether a recency degree is high or not) is judged (S24). Instead of the elapsed time from the previous commit, the average time of the intervals of past several commits may be used. If the predetermined time or more has not elapsed, it is estimated that not much time has elapsed from the time for carrying out the previous test (recency degree is high); therefore, a timer of predetermined time is activated in order to adjust test intervals by postponing and thinning execution of tests instead of executing them (S25).

If a trigger of next test execution is not generated until the timer is ended, the priority calculating process is ended, and the tests are automatically carried out (step S13 of FIG. 6 and thereafter). Note that, if the recency degree is high, instead of postponing test execution, the priorities of the test cases 134 may be increased such that the test cases 134 different from the previously carried out test cases 134 are extracted.

On the other hand, if the predetermined time or more from the previous commit has elapsed in step S24 (recency degree is low), whether the difference volume of a changed part(s) of the target program 133 is equal to or more than a predetermined volume or not is judged (S26). If the difference volume is smaller than the predetermined volume, it is determined that the necessity for carrying out the test is low, the process proceeds to step S25, and test execution is postponed. If the difference volume is equal to or more than the predetermined volume in step S26, the timer is cancelled in order to execute the tests (S27), and extraction of the test cases 134 is carried out (S28).

In the extraction of the test cases 134, priorities are set respectively for the test cases 134 by using below viewpoints, so that the test cases having high priorities are extracted. For example, as the test cases which are highly related to development parts, test cases related to corresponding functions can be selected by the types of the functions which can be distinguished from the naming rules of the branches, or, based on tasks, roles, etc. allocated to the developer who has developed the target program 133, the test cases 134 related thereto can be selected. More specifically, depending on whether the developer is a developer who is in charge of a P layer (presentation layer) of an application or a developer who is in charge of a F layer (function layer) or a D layer (data layer), the priorities of the test cases 134 corresponding to the P layer, the F layer, and the D layer can be increased.

Meanwhile, the priorities of the test cases 134 created by the developer per se of the target program 133 may be increased. Meanwhile, as for the test cases 134 which have not been executed at the time for carrying out the previous test, or the test cases 134 which have not been carried out for the predetermined time or more after the previous test is carried out, such test cases 134 have not been carried out for a certain period; therefore, the priorities may be set to be high such that these test cases 134 are extracted.

Note that, in the example of FIG. 7, the operation contents are judged depending on whether the branch of the test target is a main branch, a function branch, or a developer branch, and the method of extraction of the test cases 134 (setting of priorities) is switched; however, the operation contents of the branches serving as targets are not limited to those described above, and, for example, the operation contents may be judged to be other operation contents such as bug countermeasures, release preparation, and review requests.

Moreover, other than the judgement by the contents of the branches, the operation contents can be also judged based on the type of the commit serving as a trigger to carry out the tests. For example, if the target commit is a merge commit of a plurality of branches, it is estimated that a function integrating operation is carried out; therefore, all test cases may be configured to be executed. Moreover, if the target commit is a normal commit, it is estimated that development contents have been updated; therefore, the priorities of the corresponding test cases 134 may be increased such that regression tests are executed. Furthermore, other than the types of the commits, for example, the priorities of the related test cases 134 may be increased based on the type of a problem (issue) serving as a trigger to create a developer branch.

Moreover, the priorities can be also set such that the related test cases 134 are extracted based on the progress degree (maturity degree) of program development. For example, the progress degree is scored depending on the number of reviews for a developed program (source code) or results thereof (the number of OK/NG), and priorities can be set such that all the test cases 134 are executed if the progress degree is judged to be lower than a predetermined level and that only the important test cases 134 are executed if the progress degree is judged to be higher than the predetermined level.

Figure 8:
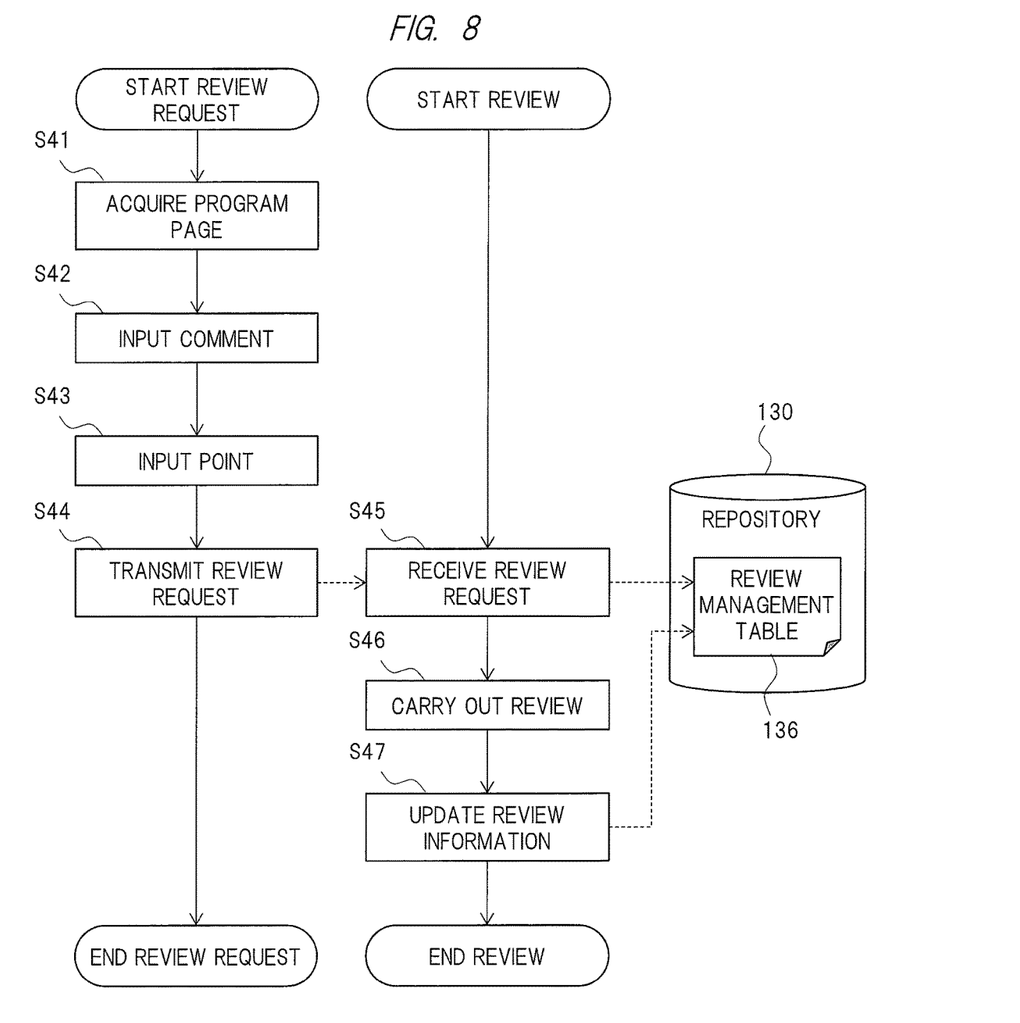
FIG. 8 is a flow chart showing an outline of a flow example of a review process for a program according to the embodiment of the present invention.

FIG. 8 is a flow chart showing an outline of a flow example of a review process for the program 133. First, a review requester acquires the program 133, which is a review target, from the repository 130 of the development supporting server 100 by using the development client 200 of the requester, and displays a page of a target part on the Web browser 210 or the like (S41). Then, the review requester inputs a comment, a review point, etc. for the reviewer (S42, S43), and commits the program 133, thereby transmitting a review request to the development supporting server 100 (S44).

The development supporting server 100 receives the review request and registers the information about the request into, for example, a later-described review management table 136 on the repository 130. Then, when the reviewer acquires a corresponding part of the target program 133 by using the development client 200 of the reviewer from the repository 130 and carries out review (S46), the configuration managing unit 110, etc. of the development supporting server 100 updates the contents of the review management table 136 based on review results (S47).

Other than the information of the number of the reviews and the results thereof as described above, as an index of determining the progress degree of program development, for example, the completion degree of source code calculated based on the number of so-called "TODD comments", the number of void methods, etc. in the source code, the progress degree of reviews for the test cases 134 related to the target program 133, etc. can be used. Moreover, the results of previously carried out tests, for example, the ratio of success/failure results, the number of successes, etc. can be also used.

<Data Configuration>

Figure 9:
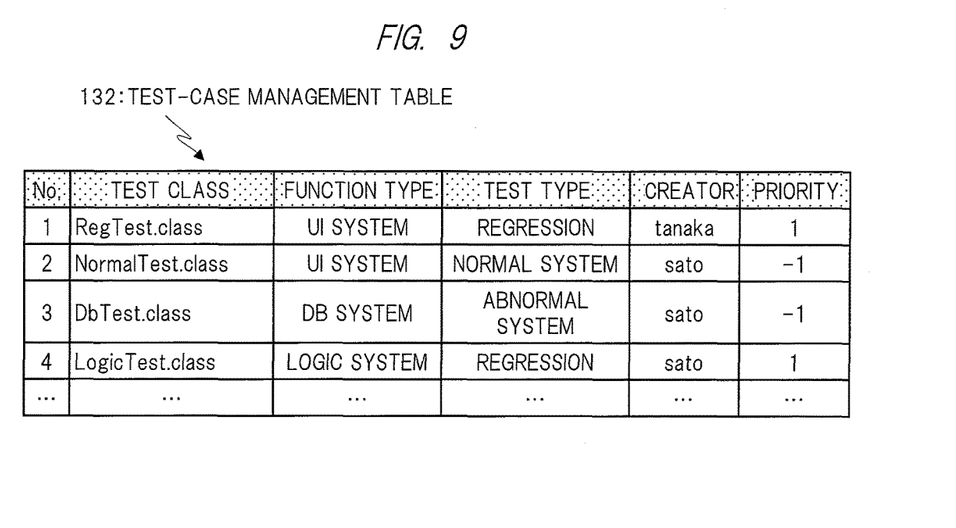
FIG. 9 is a drawing showing an outline of an example of a data configuration and specific data of a test-case management table according to the embodiment of the present invention.

FIG. 9 is a drawing showing an outline of an example of a data configuration and specific data of the test-case management table 132 retained on the repository 130 of the development supporting server 100. The test-case management table 132 is a table which retains related information including the types of the test cases 134, etc. and has, for example, items such as No., test classes, function types, test types, creators, priorities, etc.

The item of No. retains information such as sequence numbers allocated such that the test cases 134 can be uniquely identified. The item of the test classes retain the information of names which specify test programs (classes), which are executed as the target test cases 134. The item of the function types retains information such as code values which specify the types of functions on applications corresponding to the target test cases 134. In the example of FIG. 9, for the sake of convenience, they are shown by names such as "UI (User Interface) system", "DB system", and "logic system".

The item of the test types retains the information of code values, etc. which specify the types of the tests corresponding to the target test cases 134. In the example of FIG. 9, for the sake of convenience, they are shown by names such as "regression", "normal system", "abnormal system", etc. The item of creators retains the information such as IDs which identify users such as developers who have created the target test cases 134. The identification information is set in a later-described developer master 138. The item of the priorities retains the information of the priorities calculated by the priority calculating process as shown in above-described FIG. 7 for the target test cases 134. In the example of FIG. 9, the values of the priorities are "1" (extraction target) or "−1" (non extraction target); however, the method of setting the priorities is not limited thereto. For example, they can be set as numerical value ranges such as "1" to "10" or "1" to "100" or can be set by ranks such as "A", "B", and "C".

Figure 10:
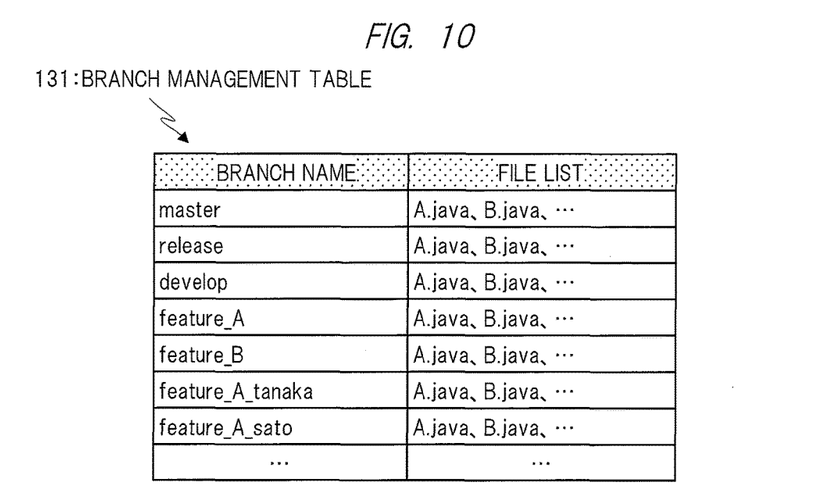
FIG. 10 is a drawing showing an outline of an example of a data configuration and specific data of a branch management table according to the embodiment of the present invention.

FIG. 10 is a drawing showing an outline of an example of a data configuration and specific data of the branch management table 131 retained on the repository 130. The branch management table 131 is a table which manages branches created on the repository 130 of the development supporting server 100 and has, for example, items such as branch names, file lists, etc.

The item of the branch names retains the information of names by which branches can be uniquely identified. For example, as shown in FIG. 3, the names are set based on predetermined naming rules, so that the types, operation contents, etc. of the target branches can be distinguished from the names. The item of the file lists retains the information consisting of lists of files including the programs 133 registered in the target branches. The example of FIG. 10 shows the data in which file names are listed for the sake of convenience, but is not limited thereto as long as all the target files (program 133) can be specified by the data structure.

Figure 11:
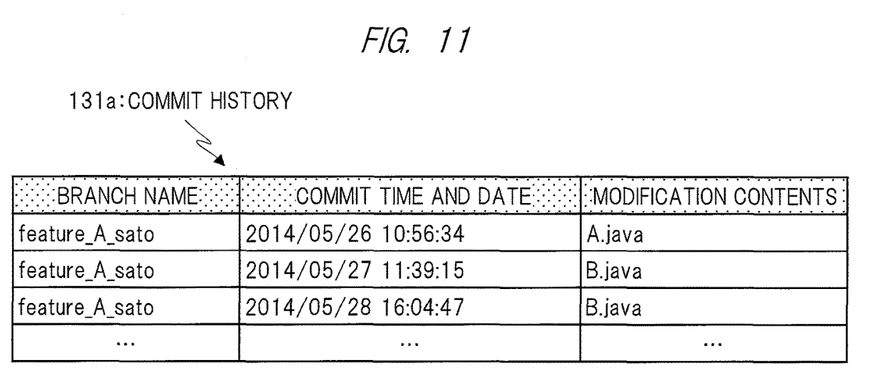
FIG. 11 is a drawing showing an outline of an example of a data configuration and specific data of a commit history according to the embodiment of the present invention.

FIG. 11 is a drawing showing an outline of an example of a data configuration and specific data of the commit history 131*a* retained on the repository 130. The commit history 131*a* is a table which retains the information of the history of registering (committing) the programs 133 in the branches and, has, for example, items such as branch names, commit time and date, and modification contents.

The item of the branch names retains the information of the branch names which specify the branches in which the programs 133 are registered. The information of the branch names is registered in the above-described branch management table 131 shown in FIG. 10. The item of the commit time and date retains the information of time stamps at which the programs 133 are committed in the target branches. The item of the modification contents retains the information of file names including the programs 133 committed as modification/change parts for the target branches.

Figure 12:
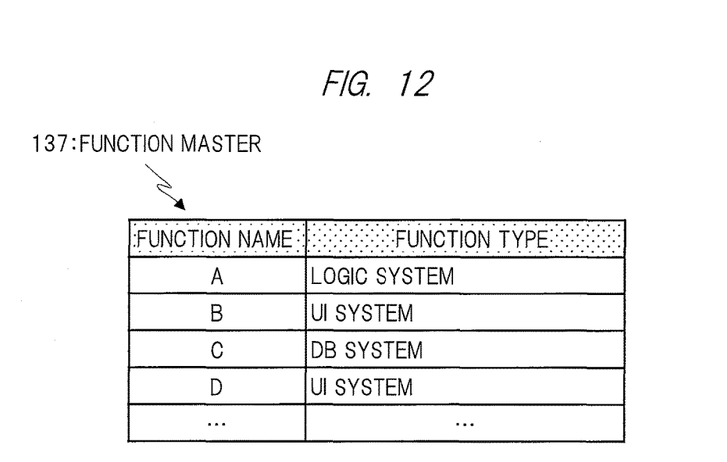
FIG. 12 is a drawing showing an outline of an example of a data configuration and specific data of a function master according to the embodiment of the present invention.

FIG. 12 is a drawing showing an outline of an example of a data configuration and specific data of the function master 137. The function master 137 is a table which retains master information about development target functions, and has items such as function names, function types, etc. The item of the function names retains information such as IDs and names for uniquely identifying target functions. The names are used in the above-described naming rules of the branches. The item of the function types retains information such as code values which specify the types of the target functions as well as the item of the function types in the above-described example of FIG. 9.

Figure 13:
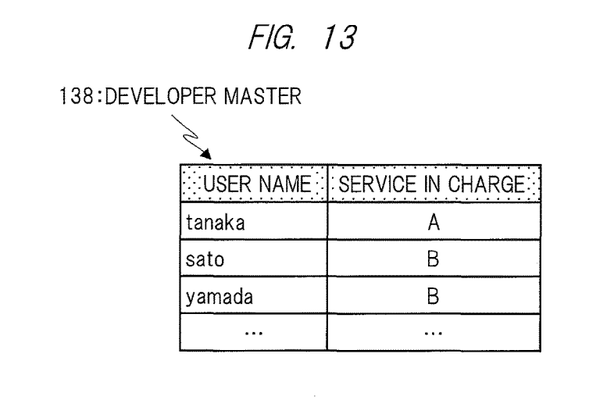
FIG. 13 is a drawing showing an outline of an example of a data configuration and specific data of a development master according to the embodiment of the present invention.

FIG. 13 is a drawing showing an outline of an example of a data configuration and specific data of the developer master 138. The developer master 138 is a table which retains master information about developers, and has items such as user names and services in charge. The item of the user names retains identification information such as IDs by which target developers can be uniquely identified. The item of the services in charge retains information such as code values for specifying one or more services, tasks, roles, etc. for which target developers are in charge in program development.

Figure 14:
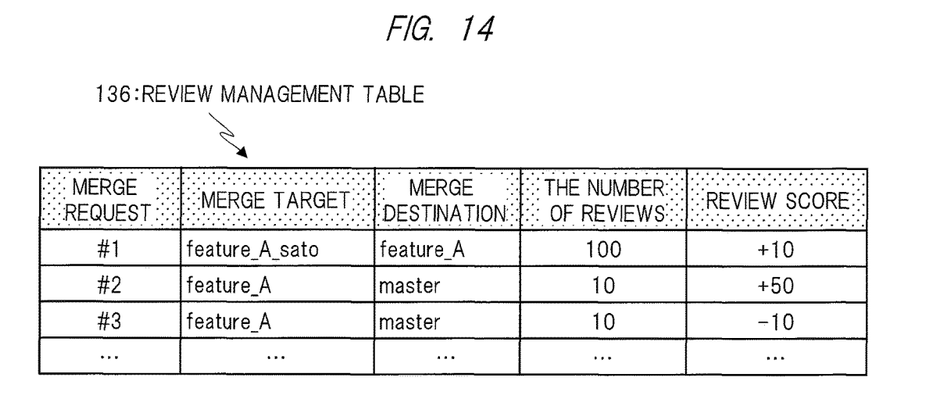
FIG. 14 is a drawing showing an outline of an example of a data configuration and specific data of a review management table according to the embodiment of the present invention.

FIG. 14 is a drawing showing an outline of an example of a data configuration and specific data of the review management table 136 retained on the repository 130. The review management table 136 is a table which manages reviews in a case where a branch including the development target program 133 is merged with a branch of a branch source, and has items such as merge requests, merge targets, merge destinations, the number of reviews, and review scores.

The item of the merge requests retains information such as sequence numbers or IDs by which merge requests can be uniquely identified. The items of the merge targets and merge destinations retain the information of the branch names which specify the branches of merge sources serving as merge targets and the branches of merge destinations (branching sources), respectively. The item of the number of reviews retains the information of the number of reviews carried out for the review requests related to merging of the target branches. A plurality of reviewers can carry out reviewing in parallel for the review requests. The item of the review scores retains the information of the scores of the reviews related to merging of the target branches. If the score is high, the quality of the target program 133 is estimated to be high, and efficiency can be improved, for example, execution of the test cases 134 is limited to important ones.

Note that the data configurations (items) of the tables shown in above-described FIG. 9 to FIG. 14 are merely examples, and other table configurations and data configurations may be used as long as similar data can be retained/managed by the configurations.

As explained above, according to the development supporting system 1, which is an embodiment of the present invention, in an environment of social coding, in consideration of various viewpoints such as development statuses of the programs 133 and tests to be carried out, the important test cases 134 can be extracted or carried out on a priority basis. As a result, tests can be efficiently carried out without exhaustively carrying out all of a massive number of test cases.

In the foregoing, the invention made by the inventors of the present invention has been concretely described based on the embodiments. However, it is needless to say that the present invention is not limited to the foregoing embodiments and various modifications and alterations can be made within the scope of the present invention. For example, the above embodiments are those described in detail in order to better illustrate the invention and are not intended to be limited to necessarily provide all the configurations described. Moreover, part of the configuration of the embodiment can be subjected to addition/deletion/replacement of other configurations.

Also, with respect to each of the configurations, functions, processing units, processing means and the like described above, a part or all thereof may be achieved by hardware such as designing by an integrated circuit for example. Further, each of the configurations, functions and the like described above may be achieved by software by that a processor interprets and executes a program that achieves each of the functions. Information such as the program, table, file and the like achieving each of the functions can be placed in a recording device such as a memory, hard disk, SSD (Solid State Drive) and the like, or in a storage medium such as an IC card, SD card, DVD and the like.

Furthermore, with respect to the control line and information line, those supposed to be necessary for explanation are shown, and all of the control lines and information lines in the product are not necessarily shown. It is right thinking that almost all configurations are connected to each other in actual fact.

INDUSTRIAL APPLICABILITY

The present invention can be utilized in a development supporting system, which extracts test cases in tests for, for example, checking failure of programs.

REFERENCE SIGNS LIST

1 . . . DEVELOPMENT SUPPORTING SYSTEM, 100 . . . DEVELOPMENT SUPPORTING SERVER, 110 . . . CONFIGURATION MANAGING UNIT, 120 . . . TEST EXECUTING UNIT, 130 . . . REPOSITORY, 131 . . . BRANCH MANAGEMENT TABLE, 131a . . . COMMIT HISTORY, 132 . . . TEST-CASE MANAGEMENT TABLE, 133 . . . PROGRAM, 134 TEST CASE, 135 TEST RESULT, 136 REVIEW MANAGEMENT TABLE, 137 . . . FUNCTION MASTER, 138 . . . DEVELOPER MASTER, 200 . . . DEVELOPMENT CLIENT, 201 . . . TEST-CASE ADDITIONAL INFORMATION, 210 . . . Web BROWSER, 220 . . . CODE DESCRIBING UNIT, 230 . . . CONFIGURATION-MANAGEMENT MANIPULATING UNIT, 300 . . . NETWORK, 401 . . . MASTER BRANCH, 402 . . . DEVELOPMENT BRANCH, 403 . . . FUNCTION A DEVELOPMENT BRANCH, 404 . . . FUNCTION A DEVELOPER XXX BRANCH

The invention claimed is:

1. A development supporting system that tests a program by executing one or more test cases, the development supporting system comprising:
   a processor and a memory coupled to the processor, the memory storing instructions that when executed by the processor, cause the processor to execute:
   a configuration managing unit that retains and manages the program and each of the test cases in a repository; and
   a test executing unit that executes the test case and stores a test result in the repository;
   wherein the test case is managed in the repository in association with information of a type thereof,
   the configuration managing unit calculates a recency degree of registration based on timing at which the program is registered in a branch and sets a priority for each of the test cases based on the recency degree, and
   the test executing unit extracts the test case to be executed based on the priority.

2. The development supporting system according to claim 1,
   wherein the configuration managing unit calculates the recency degree based on a time interval from timing at which the program is previously registered in the branch to timing at which the program is currently registered.

3. The development supporting system according to claim 1,
   wherein the configuration managing unit calculates the recency degree based on an average value of a time interval between registrations in a past predetermined number of times which the program is registered in the branch.

4. The development supporting system according to claim 1,
   wherein the configuration managing unit calculates the recency degree based on a difference volume from a previous registration in the program registered in the branch.

5. The development supporting system according to claim 1,
   wherein if the recency degree is high, the configuration managing unit prevents the test executing unit from extracting the test case.

6. The development supporting system according to claim 1,
   wherein if the recency degree is high, the configuration managing unit increases the priority of the test case different from the test case executed at a time for carrying out a previous test.

* * * * *